United States Patent
Goncalves

(10) Patent No.: US 9,674,125 B2
(45) Date of Patent: Jun. 6, 2017

(54) METHOD AND SYSTEM FOR ACHIEVING COMMUNICATIONS IN A MANNER ACCOUNTING FOR ONE OR MORE USER PREFERENCES OR CONTEXTS

(71) Applicant: Motorola Mobility LLC, Chicago, IL (US)

(72) Inventor: Alex G Goncalves, Sunnyvale, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 412 days.

(21) Appl. No.: 14/203,776

(22) Filed: Mar. 11, 2014

(65) Prior Publication Data
US 2015/0172242 A1 Jun. 18, 2015

Related U.S. Application Data

(60) Provisional application No. 61/916,081, filed on Dec. 13, 2013.

(51) Int. Cl.
*G06F 15/16* (2006.01)
*H04L 12/58* (2006.01)
(Continued)

(52) U.S. Cl.
CPC ........ *H04L 51/12* (2013.01); *G06Q 10/107* (2013.01); *H04L 51/063* (2013.01)

(58) Field of Classification Search
CPC ......... G06F 11/1076; G06F 2211/1028; G06F 12/1408; H04L 67/10; H04L 67/1097;
(Continued)

(56) References Cited

U.S. PATENT DOCUMENTS

2010/0046842 A1* 2/2010 Conwell .......... G06F 17/30265
382/218
2010/0048242 A1* 2/2010 Rhoads ............. G06F 17/30244
455/556.1
(Continued)

FOREIGN PATENT DOCUMENTS

| WO | 2010021833 A2 | 2/2010 |
| WO | 2013098587 A1 | 7/2013 |

*Primary Examiner* — Zarni Maung
(74) *Attorney, Agent, or Firm* — Remarck Law Group PLC

(57) ABSTRACT

A method and system for selectively communicating information are disclosed herein. In at least one embodiment, the method includes receiving at a server first information portions regarding one or more preferences, instructions, user profile details, or operational history details. The method also includes receiving an initial version of a message including additional information from a mobile device associated with a user, and determining based upon the first information portions that the additional information should be modified. The method further includes generating a first modified version of the message by modifying the additional information, and sending, for receipt by a further mobile device associated with a further user, the first modified version. Accordingly, in at least some embodiments, the first modified version of the message can include additional relevant content suited for each given recipient, based on (for example) preference, profile, or history information.

20 Claims, 5 Drawing Sheets

(51) Int. Cl.
*G06Q 10/10* (2012.01)
*G06F 12/00* (2006.01)

(58) Field of Classification Search
CPC ........... H04L 2463/061; H04L 63/0428; H04L 67/26; H04L 9/0825; H04L 2463/082; H04L 63/107; H04L 67/04; H04L 67/06; H04L 67/22; H04L 12/1859; H04L 12/5815
USPC .................. 709/206, 207, 223–229, 250
See application file for complete search history.

(56) References Cited

U.S. PATENT DOCUMENTS

| | | | |
|---|---|---|---|
| 2012/0250951 A1 | 10/2012 | Chen | |
| 2013/0159919 A1* | 6/2013 | Leydon | G06F 3/0236 715/780 |
| 2013/0346515 A1* | 12/2013 | DeLuca | G06Q 50/01 709/206 |
| 2014/0080428 A1* | 3/2014 | Rhoads | G06F 17/30241 455/88 |
| 2014/0181229 A1* | 6/2014 | Tucker | H04L 12/1827 709/206 |

* cited by examiner

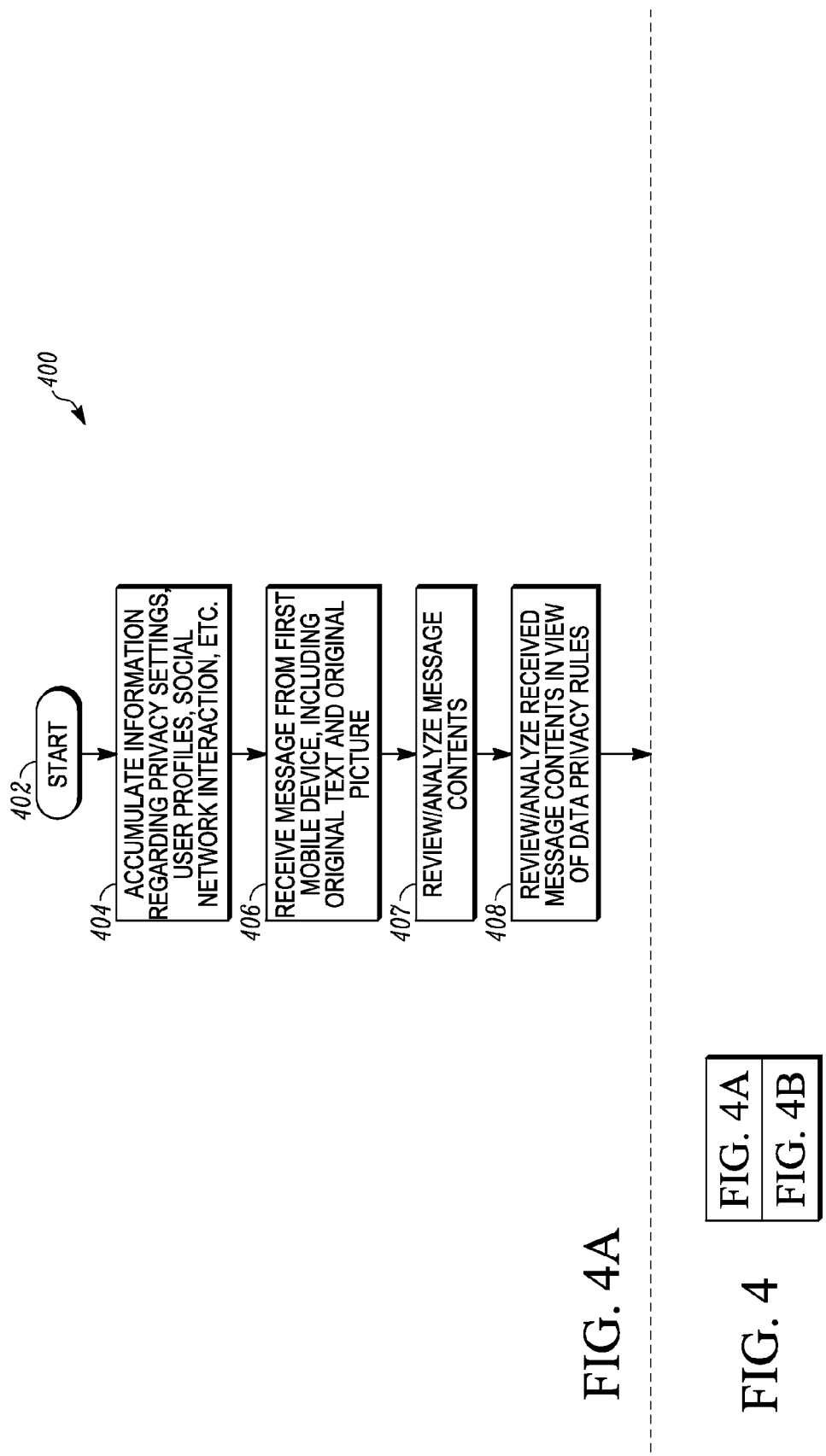

METHOD AND SYSTEM FOR ACHIEVING COMMUNICATIONS IN A MANNER ACCOUNTING FOR ONE OR MORE USER PREFERENCES OR CONTEXTS

CROSS-REFERENCE TO RELATED APPLICATION(S)

This application is a non-provisional application of co-pending and commonly assigned U.S. Provisional Patent Application No. 61/916,081, filed on Dec. 13, 2013, from which benefits under 35 USC §119(e) are hereby claimed and the contents of which are hereby incorporated by reference herein.

FIELD OF THE DISCLOSURE

The present disclosure relates to communications between or among electronic devices such as mobile devices and web servers and, more particularly, to methods and systems for achieving such communications in manners involving modifications or other processing of the communications so that the communications take into account one or more user preferences or contexts or other relevant information.

BACKGROUND OF THE DISCLOSURE

Content provider websites (CPWs) are interactive websites that allow for the downloading and/or uploading (e.g., posting) of various forms of information or data (which can generally be considered "content") to or from user-operated electronic devices such as mobile devices by way of various communication media including, for example, internet-type networks. CPWs encompass a variety of types of websites including, for example, social networking websites (SNWs), news feeds, music and photograph websites, as well as other types of websites such as business-to-business (b2b) or business-to-consumer (b2c) websites. The forms of content that can be downloaded from and/or uploaded to CPWs are wide ranging and can include, for example, news, weather, personal and/or business information, pictures, videos, songs, etc. CPWs can also encompass any website that can potentially receive communication(s) from one or more persons or entities and in turn forward on to other person or entities related communications (including, for example, email messages).

As the popularity of CPWs and particularly SNWs has grown, the amount of information provided to and from those CPWs (and especially SNWs) has grown enormously. Further, it has become common in the context of many CPWs, and particularly in the context of many SNWs, for messages or other communications to be sent between different users (or, more particularly, between the electronic devices being operated by or otherwise associated with different users) by way of the SNWs In some circumstances, a message sent by a given user (e.g., from the electronic device of that user) is intended to be sent to multiple other users (e.g., intended to be delivered to the electronic devices of multiple users), and a CPW such as an SNW can also facilitate communication of this type as well.

Notwithstanding the advantages that can be afforded by allowing for communications to occur between or among users by way of CPWs such as SNWs, with such communications there arise various opportunities and concerns. For example, users who communicate with SNWs often have accounts with those SNWs and, as part of establishing or managing their accounts, the users can specify user preferences (e.g., determine user settings) about what types of information should or should not be communicated, or should or should not be made available to other users or third parties. Yet any given message sent by a given user can in some circumstances include information concerning a second user that, if that given message was forwarded to a different third party user by way of the SNW, the transmission of the message might violate a user preference of the second user.

Therefore, it would therefore be advantageous if improved methods and/or systems for communication were developed, particularly in relation to any of a variety of communications occurring between or among electronic devices such as mobile devices that proceed via CPWs (e.g., SNWs) or any of a variety of other intermediary web servers.

BRIEF DESCRIPTION OF THE DRAWINGS

FIG. 4, which includes FIGS. 4A and 4B, is a flow chart showing various example steps of operation of some of the components of the system of FIG. 1 (and particularly the intermediary server of FIGS. 1 and 3) as those components interact with one another.

DETAILED DESCRIPTION

Figure 1:
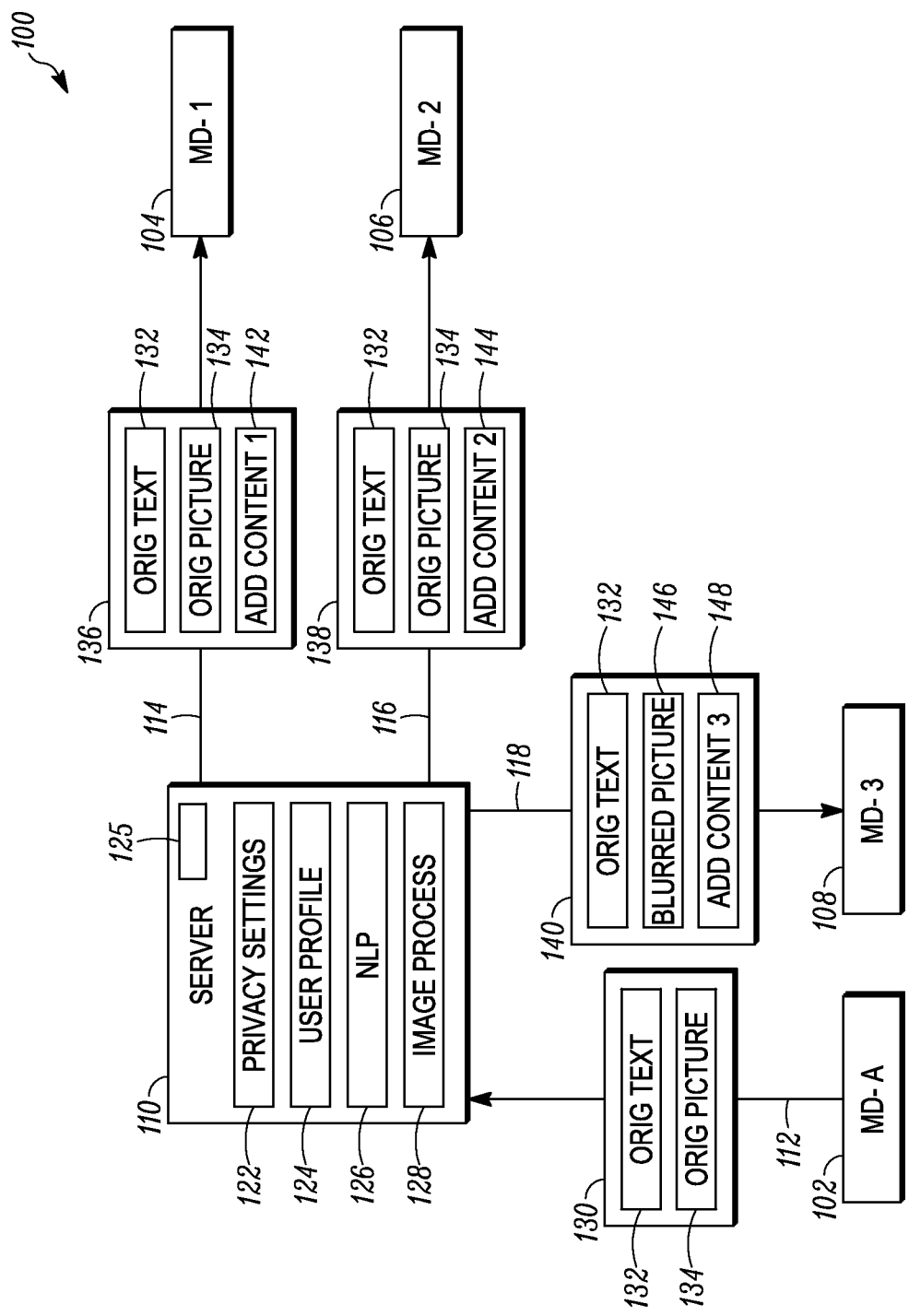
FIG. 1 shows in schematic form an example communications system involving a plurality of electronic devices in communication with one another by way of an intermediary server.

Referring to FIG. 1, a block diagram of an example communications system 100 is shown in a simplified schematic form. As shown, the communications system 100 includes in this embodiment first, second, third, and fourth mobile devices 102, 104, 106, and 108 and a server, which in the present embodiment is a web server 110 (e.g., a server that supports internet protocols or otherwise is capable of interaction with the Internet or World Wide Web). Also as shown, the first mobile device 102 is shown to be in communication with the web server 110 by way of a first communication link 112, and the second, third, and fourth mobile devices 104, 106, and 108 respectively are shown to be in communication with the web server 110 by way of second, third, and fourth communication links 114, 116, and 118, respectively.

The mobile devices 102, 104, 106, and 108 are respectively representative of communication devices operated by persons (or users) or possibly by other entities (e.g., other computers) desiring or requiring communication capabilities. In some embodiments, for example, each of the mobile devices 102, 104, 106, and 108 can be any of cellular telephones, personal digital assistants (PDAs), smart phones, other handheld or portable electronic devices, headsets, MP3 players, battery-powered devices, wearable devices, wristwatches, radios, navigation devices, laptop or notebook computers, netbooks, pagers, PMPs (personal media players), DVRs (digital video recorders), gaming devices, game interfaces, cameras, netbooks, e-readers, e-books, tablet devices, navigation devices with video capable screens, multimedia docking stations, or other mobile devices.

In the present embodiment, the web server 110 is that of a social networking website (SNW). Although the web server 110 in the present embodiment is that of a SNW, this is only intended to be exemplary. In other embodiments, the web server can take the form of any of a variety of other types of content provider website (CPW), where CPWs are generally intended to encompass a variety of interactive websites (including but not limited to SNWs) that allow for the downloading, uploading (e.g., posting), and/or other accessing of various forms of data, such as personal and/or business information, news information, weather information, pictures, videos, and songs and thereby facilitate the creation and maintaining of interpersonal connections among persons and groups of persons. Examples of such CPWs include, for example, Facebook™, MySpace™, hi5™, LinkedIn™, and Twitter™.

For purposes of the present invention, CPWs can also be understood to encompass various other types of websites (e.g., business-to-business websites, business-to-consumer websites and/or other websites that, while not focused entirely or predominantly upon social networking, nevertheless also include social networking-type features). For example, other CPWs can include sources of RSS (Really Simple Syndication) or other news feeds, photograph services such as Picasa™ or Photobucket™, and music services such as LastFM™. Generally speaking, the CPWs can encompass any websites to which data can be uploaded and/or from which data can be downloaded to mobile devices such as the mobile devices 102, or any website that can potentially receive communication(s) from one or more persons, entities, or devices and/or in turn forward on to other persons, entities or devices related communications. Such websites can include, among other things, websites that receive email messages, text messages, or information received due to user entry of information into forms provided via web pages, etc., as well as websites that transmit email message, text messages, and information via other communication formats or methodologies. Further, in other alternate embodiments, the web server 110 can be another form of intermediary web server other than a CPW or SNW.

As already mentioned, in the present embodiment the respective mobile devices 102, 104, 106, and 108 are respectively shown to be in communication with the web server by way of respective communication links 112, 114, 116, and 118, respectively. It should be appreciated that, depending upon the embodiment, the communication links 112, 114, 116, and 118 can be part of a single network or multiple networks, and each link can include one or more wired and/or wireless communication pathways, for example, landline (e.g., fiber optic, copper) wiring, microwave communication, radio channel, wireless path, intranet, internet, and/or World Wide Web communication pathways (which themselves can employ numerous intermediary hardware and/or software devices including, for example, numerous routers, etc.). In addition, a variety of communication protocols and methodologies can be used to conduct the communications via the communication links 112, 114, 116, 118 among the mobile devices 102, 104, 106, 108 and the web server 110 including for example, transmission control protocol/internet protocol (TCP/IP), extensible messaging and presence protocol (XMPP), file transfer protocol (FTP), etc.

Although FIG. 1 shows particularly four of the mobile devices 102, 104, 106, and 108 as being in communication with the web server 110, it should be appreciated that this is merely an example and that in other embodiments any arbitrary number of mobile devices can be in communication with the web server 110. For example, in at least some embodiments, there will be only a pair of mobile devices (or other electronic devices) in communication with one another by way of the web server 110 and, in other embodiments, some other number of mobile devices (or other electronic devices) will be in communication. Further, although in the present embodiment the communication links 112, 114, 116, and 118 (or network) and web server 110 are each discussed as being web-based, in other embodiments, the links/network and server can assume various non-web-based forms.

In the present embodiment, the web server 110 is configured to serve as an intermediary between or among multiple ones (e.g., two or more) of the mobile devices 102, 104, 106, and 108 (and/or possibly between or among one or more of those mobile devices and/or other mobile devices or electronic devices or other devices). Depending upon the embodiment or operational circumstances, various types of communications between and among the mobile devices 102, 104, 106, and 108 are or can be passed through, processed and/or monitored by the web server 110 including, for example, communications involving the sending of email messages and other forms of messaging messaging (e.g., Short Message Service (SMS), Multimedia Messaging Service (MMS), and Instant Messaging (IM)), as well as communications involving the sending of files (e.g., photos, music, videos, text entries, etc.), blog postings, etc. Notwithstanding the above, it should also be appreciated that, depending upon the time or operational circumstance, any two or more of the mobile devices 102, 104, 106, 108 (or other mobile or electronic devices) can also or alternatively enter into communication with each other by way of other communication links, including for example direct communication links.

FIG. 1 is particularly intended to illustrate certain example communications among the mobile devices 102, 104, 106, 108 and the web server 110, namely, a first message 130 sent from the mobile device 102 to the web server 110 via the first communication link 112, a second message 136 sent from the web server 110 to the second mobile device 104 via the second communication link 114, a third message 138 sent from the web server 110 to the third mobile device 106 via the third communication link 116, and a fourth message 140 sent from the web server 110 to the fourth mobile device 108 via the fourth communication link 118. As will be described in further detail below, in accordance with embodiments of the present disclosure, the web server 110 operates to receive the first message 130 and to perform processing in relation thereto, and then generates and sends out the second, third, and fourth message 136, 138, and 140, respectively, to the second, third, and fourth mobile device 104, 106, and 108, respectively. That is, the second, third, and fourth message 136, 138, and 140, respectively, are generated by the web server 110 based at least in part upon the first message 130.

Also as will be described in further detail below, in the present embodiment, the processing performed by the web server 110 in the present embodiment is based at least in part upon one or more of various information stored (or available to) the web server 110, which is represented in FIG. 1 as privacy settings information 122, user profile information 124, social network interaction history information 125, natural language processing (NLP) information, and image processing information 128. It should be appreciated that one or more of the privacy settings information 122, user profile information 124, and social network interaction history information (and/or possibly other types of information stored at or available to the web server 110) can include identity, preference, and/or historical information or data pertaining to any of a variety of users, entities, mobile devices, or other devices that are interacting with, or have interacted with, the web server 110 or over time.

Although the privacy settings information 122, user profile information 124, social network interaction history information 125, natural language processing (NLP) information 126, and image processing information 128 are all shown in FIG. 1 and referred to as being types of information that are stored in the web server 110, as will be appreciated from the further explanation below, these types of information should be understood expansively as encompassing any of a variety of types of data or other information, including program information that enables the web server 110 to perform various types of processing. For example, the NLP information 126 should be understood to include programming (e.g., computer code or, more generally, tools) for performing natural language processing, and the image processing information 122 should be understood to include programming (or tools) for performing image processing.

Although the exact contents of the first, second, third, and fourth messages 130, 136, 138, and 140 are described in further detail below, it should be again understood that these messages are merely provided as examples of communications and that the present disclosure is intended to encompass any of a variety of different communications with any of a variety of contents. Likewise, the particular information that is used by the web server 110 to process or modify the contents of any messages can vary depending upon the embodiment. Among other things, in at least some embodiments, only one or more of, but not all of, the privacy settings information 122, user profile information 124, social network interaction history information 125, NLP information 126, and image processing information 128 is stored in the web server 110 and/or utilized by the web server 110 in performing processing or modifying the contents of communications.

Figure 2:
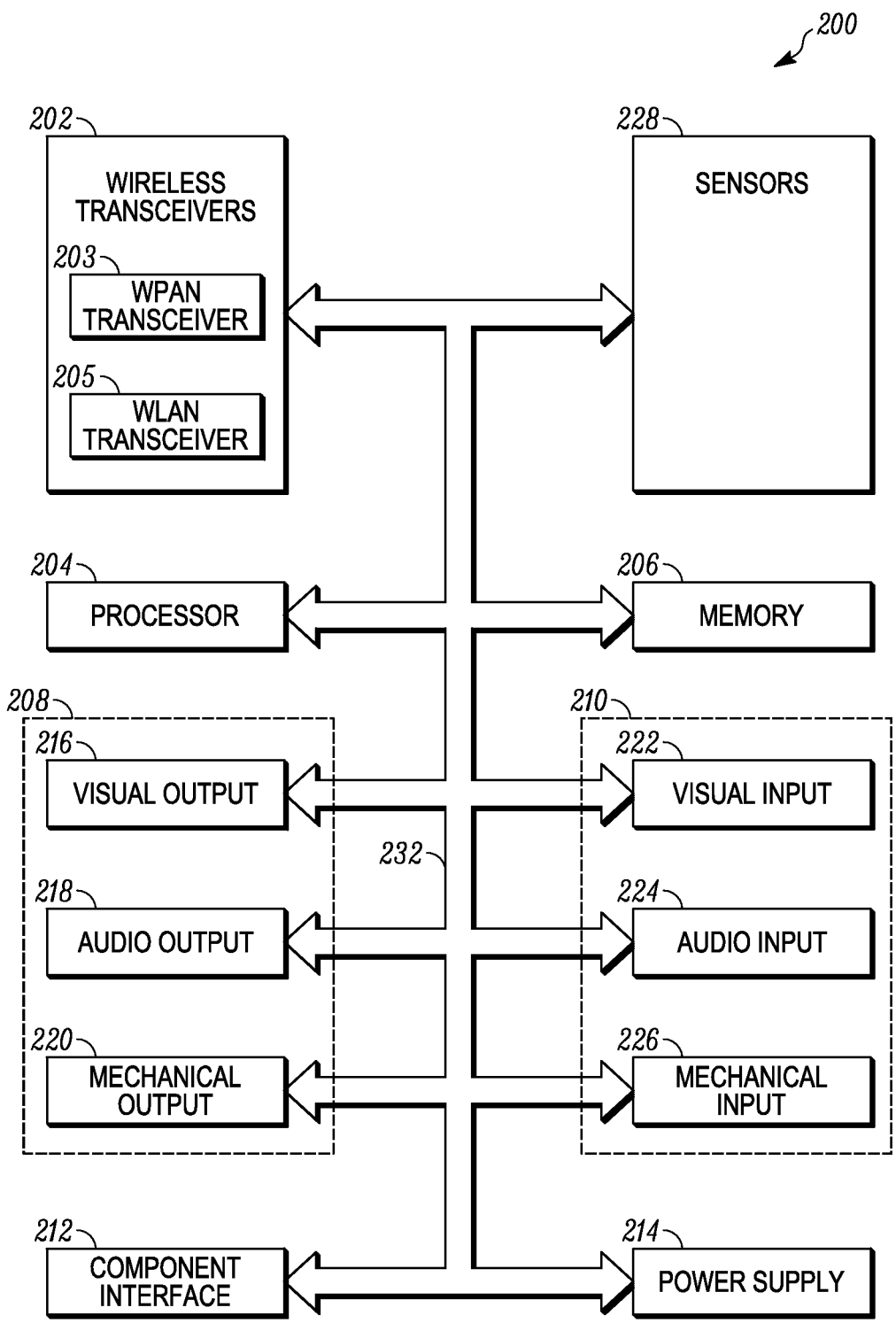
FIG. 2 is a block diagram showing example components of an example one of the electronic device of FIG. 1.

FIG. 2 provides a block diagram illustrating example internal components 200 of the first mobile device 102 of FIG. 1, although it should be recognized that this block diagram and the example internal components are equally representative of internal components that can be provided in any of the mobile device 102, 104, 106, and 108 (or any other mobile device that can be in communication with the web server 110). As shown in FIG. 2, the internal components 200 of the mobile device 102 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 also include a power supply 214, such as a battery, for providing power to the other internal components while enabling the mobile device 102 to be portable. Further, the internal components 200 additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a wireless personal area network (WPAN) transceiver 203 and a wireless local area network (WLAN) transceiver 205. More particularly, the WPAN transceiver 203 is configured to conduct short-range wireless communications, using a protocol such as IEEE 802.15 Bluetooth®, IEEE 802.15.4 ZigBee, NFC, RFID, infrared, HomeRF, Home Node B, or others or variants thereof. By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, either the WPAN transceiver 203 or the WLAN transceiver 205 can be replaced or supplemented with one or more other wireless transceivers configured for other forms of wireless communications including, for example, cellular or non-cellular wireless communications.

Although in the present embodiment the mobile device 102 has two of the wireless transceivers 202 (that is, the transceivers 203 and 205), the present disclosure is intended to encompass numerous embodiments in which any arbitrary number of wireless transceivers employing any arbitrary number of communication technologies are present as well as mobile or other electronic devices that do not have any wireless communications capability. In the present embodiment, by virtue of the use of the wireless transceivers 202, the mobile device 102 is capable of communicating with any of a variety of other devices or systems (not shown) including, for example, the web server 110, other web servers, other mobile devices or other electronic devices, cell towers, access points, other remote devices, other computer systems, etc. Depending upon the embodiment or circumstance, wireless communication between the mobile device 102 and any arbitrary number of other devices or systems can be achieved.

Operation of the wireless transceivers 202 in conjunction with others of the internal components 200 of the mobile device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio, and/or mechanical outputs. For example, the output device(s) 208 can include one or more visual output devices 216 such as a video screen, a liquid crystal display and/or light emitting diode indicators, one or more audio output devices 218 such as a speaker, alarm, and/or buzzer, and/or one or more mechanical output devices 220 such as a vibrating mechanism. Likewise, by example, the input device(s) 210 can include one or more visual input devices 222 such as an optical sensor (for example, a camera lens and photosensor), one or more audio input devices 224 such as a microphone, and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening or unlocking some portion of the mobile device 102, moving the device to actuate a motion, moving the device to actuate a location positioning system, and operating the device.

As mentioned above, the internal components 200 also can include one or more of various types of sensors 228. For example, in at least some embodiments, the sensors 228 can include one or more components or devices that allow for position or motion sensing, gesture detection, pressure sensing, or other types of sensing or detection including, for example, an accelerometer, a gyroscope, or a barometer. Also for example, depending upon the embodiment, the sensors 228 can include any of a variety of other sensor types including, for example, proximity sensors (e.g., a light detecting sensor, an ultrasound transceiver, or an infrared transceiver), touch sensors, altitude sensors, and one or more location circuits/components that can include, for example, a Global Positioning System (GPS) receiver, a triangulation receiver, a tilt sensor, or any other information collecting device that can identify a current location or user-device interface (carry mode) of the mobile device 102.

Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). For example, in embodiments in which a touch screen display is employed, such a touch screen display can be considered to constitute both a visual output device and a mechanical input device.

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the mobile device 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data or information that is stored by the memory portion 206 (or, in some alternate embodiments, instead or additionally stored by one or more other memory portion(s) located apart from the mobile device) can include, but need not be limited to, operating systems, programs (applications), and informational data. Each operating system includes executable code that controls basic functions of the mobile device 102, such as interaction among the various internal components 200, communication with external devices via the wireless transceivers 202 and/or the component interface 212, and storage and retrieval of programs and data to and from the memory portion 206. As for programs, each program includes executable code that utilizes an operating system to provide more specific functionality, such as file system service and handling of protected and unprotected data stored in the memory portion 206. Such programs can include, among other things, programming for enabling the mobile device 102 to perform processes such as calculating position, movements, acceleration, or metrics based upon information from sensors (e.g., information from an accelerometer 110), sampling and processing gesture or movement-related information, and performing processes for gesture recognition or recognizing control movements.

Finally, with respect to informational data, this is non-executable code or information that can be referenced and/or manipulated by an operating system or program for performing functions of the mobile device 102. Such informational data can include, among other things, portions of data that are or can be encompassed or transmitted as part of any of the messages 13, 136, 138, 140 including, as will be described further below, textual data, image (e.g., picture file) data, video data, and other types of data.

Figure 3:
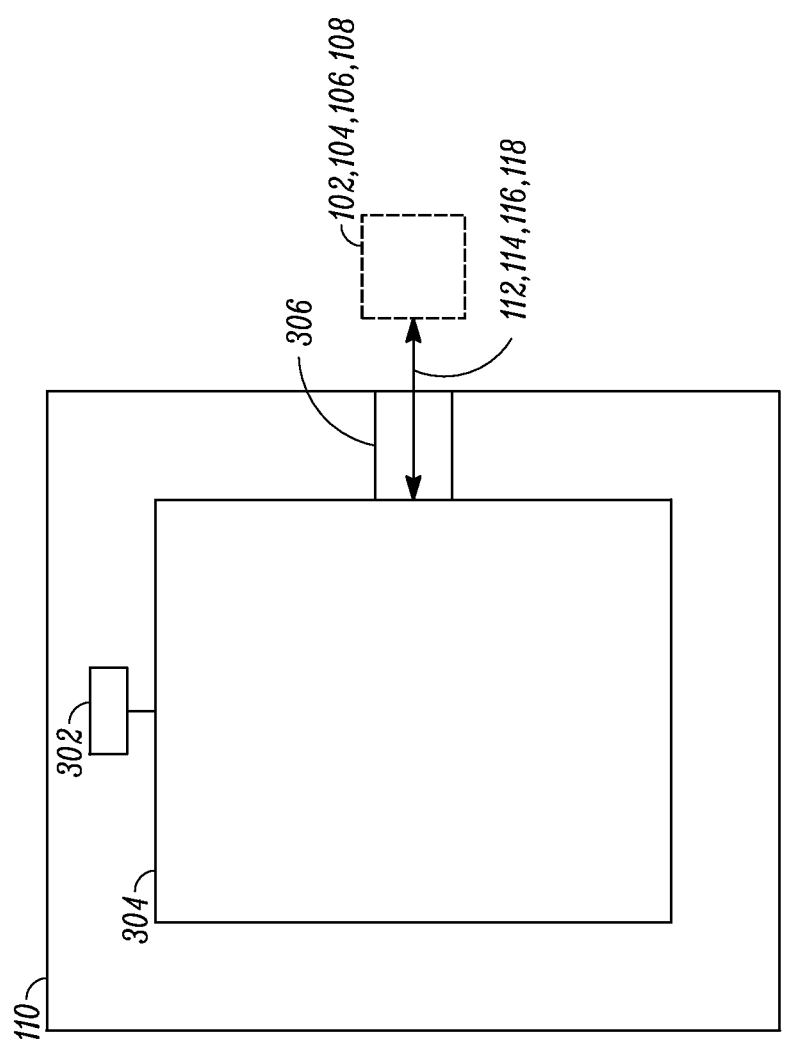
FIG. 3 is a block diagram showing example components of the intermediary server of FIG. 1.

Referring next to FIG. 3, example components of the web server 110 of FIG. 1 are shown in more detail. As shown, the web server 110 includes a memory portion 302, a processor portion 304 in communication with that memory portion, and one or more input/output (I/O) interfaces 306 for interfacing the communication links 112, 114, 116, and 118 with the processor portion 304 so as to allow for intercommunications between the communication links and the processor portion (and therefore also allowing for intercommunications with the memory portion 302). In the present embodiment, the web server 110 is that of a SNW, albeit in other embodiments it can be that of another type of CPW or another type of web server or other server computer or other computer including, further for example, one or more computers that form or are part of a cloud. In at least some embodiments including the present embodiment, the web server 110 can also be understood to serve as an aggregation server since the web server keeps track of and aggregates a variety of information that is from, or that is intended to be provided to or otherwise relates to, one or more users who are in communication with the web server 110 or one or more devices such as any of the mobile devices 102, 104, 106, 108 that are in communication with the web server including, for example, the social network interaction history information 125.

Although FIGS. 1 and 3 show the single web server 110, it should be understood that in other embodiments there can be more than one intermediating device constituting a cloud (or implemented in place of the server 110) including, for example, a collection of multiple servers that are in communication with one another and that, in at least some embodiments, support Internet technologies for communication between entities. Also, in at least some embodiments, the server 110 (or corresponding cloud or other intermediating device(s)) can employ web 2.0 functionality and beyond including, for example, further evolution of such functionality and/or new push functionality. Additionally, in some embodiments, the server 110 (or corresponding cloud or other intermediating device(s)) is capable of supporting and creating services and applications for registration, storing and relaying client capabilities and/or preferences, among other things.

Depending upon the embodiment, the processor portion 304, memory portion 302, and I/O interfaces 306 can take any of a variety of forms. For example, the processor portion 304 (as with the processor 204) can take any of a variety of forms such as a microprocessor, microcomputer, application-specific integrated circuit, etc. Also for example, the I/O interfaces 306 can encompass any of a variety of different components or devices such as wireless transceivers, I/O ports for receiving cables or wired connections that allow the web server 110 to intercommunicate with one or more networks such as the Internet, and/or any of a variety of other components or devices. In particular, the I/O interfaces 306 should particularly be understood to encompass components or devices that allow the server 110 to directly or indirectly intercommunicate with mobile devices such as the mobile devices 102, 104, 106, 108 or other mobile devices or other electronic (or other) devices, or to intercommunicate with networks such as the Internet by which the web server 110 is then further able to intercommunicate with such mobile devices or other electronic (or other) devices.

Also for example, the memory portion 302 can encompass one or more memory devices of any of a variety of forms (e.g., read-only memory, random access memory, static random access memory, dynamic random access memory, etc.), and can be used by the processor portion 304 to store and retrieve data. In some embodiments, the memory portion 302 can be integrated with the processor portion 304 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 302 of the web server 110 can be supplemented or replaced by other memory portion(s) located elsewhere apart from the web server and, in such embodiments, the web server can be in communication with or access such other memory device(s) by way of any of various communications techniques, for example, wireless or wired communications.

As described above with respect to the memory portion 206, the memory portion 302 of (or otherwise associated with or accessible to) the web server 110 can store any of a variety of types of data or information, including operating systems, programs (applications), and informational data. In the present embodiment, the memory portion 302 of the web server 110 particularly stores, as already described above, the privacy settings information 122, user profile information 124, social network interaction history information 125, NLP information 126, and image processing information 128. These portions of information can include both informational data as well as programming, including programming that enables the web server 110 to process and/or generate messages or other communications such as the messages 130, 136, 138, and 140 of FIG. 1 as described above and below herein. Among other things, such programming enables processing or generating of messages in accordance with any of a variety of natural language processing and/or image processing algorithms and, for at least this reason, the processor 304 can in some cases be considered as including a natural language processor and/or an image processor (in this sense, the NLP information 126 and image processing information 128 shown in FIG. 1 can also be considered as representing a natural language processor and image processor, respectively).

It should be appreciated also that, in the present embodiment, much of the data or information stored in the memory portion 302 of the web server 110 is data or information that has been received (or developed) as a result of communications with users or mobile devices (or other devices) such as the mobile devices 102, 104, 106, 108 that are associated with or otherwise operated by users. For example, the privacy settings information 122 in at least some embodiments include data privacy rules that are set based upon communications sent from users (or mobile devices associated with or operated by users) to the web server 100, in its capacity as a SNW, when those users become members of and set up accounts with the SNW, or subsequently when those users modify their accounts. Also for example, the user profile information 124 in at least some embodiments is determined based upon information entered into web page forms that are made available to the users via the users' mobile devices when the users are establishing accounts with the SNW (or when the users modify details of their user profiles after the accounts have been established).

Further, the social network interaction history information 125 can include data recorded by the web server 110 as various users (and/or their associated mobile devices or other devices) interact with the web server 110 over time. In at least some circumstances, the social network interaction history information can be considered to be encompassed as part of the user profile information, although in other cases the user profile information refers more particularly to information regarding user identities, characteristics, or preferences, while social network interaction history information refers to information concerning users' behavior over time (as well as possible behavior of others or other interactions that are occurring over time). Although the privacy settings information 122, user profile information 124, and social network interaction history information 125 can in at least some embodiments be information that is received primarily or entirely during ongoing operation of the web server 110, the NLP information 126 and image processing information 128 can be information that is pre-programmed into the web server 110. Alternatively, the NLP information 126 and/or image processing information 128, or updates thereof, can be obtained from any of a variety of sources (including possibly via software updates) during ongoing operation of the web server 110.

Figure 4B:
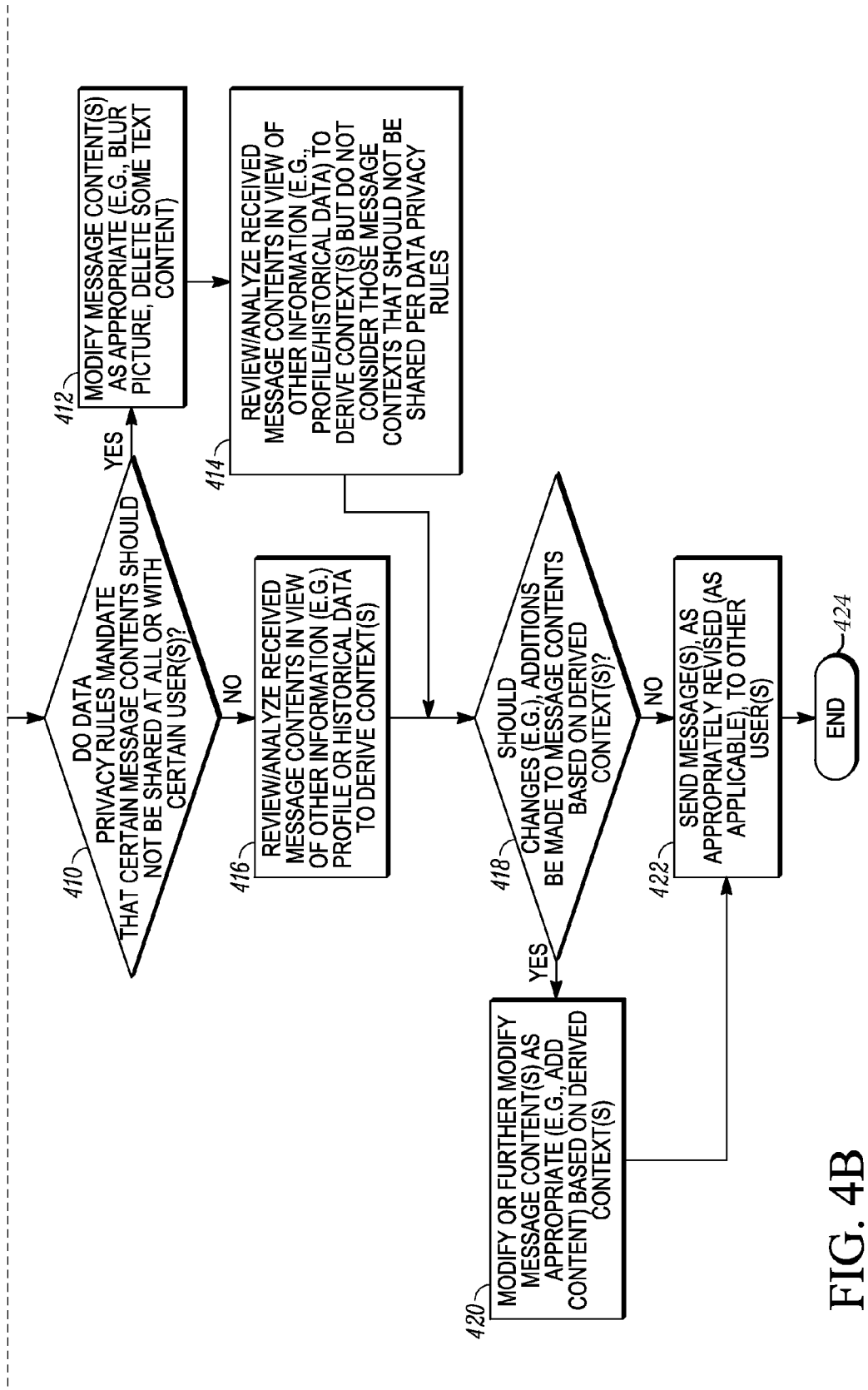

Turning now to FIG. 4, an example flow chart 400 shows example steps of operation of the system 100 and particularly example steps of operation of the web server 110 as it interacts with mobile devices such as the mobile devices 102, 104, 106, and 108 of FIG. 1. Several of the steps of the flow chart 400 discussed below are particularly described in relation again to FIG. 1, which in addition to showing the example system components already described above, also shows the example messages 130, 136, 138, and 140 transmitted among the mobile devices 102, 104, 106, and 108 and the server 110. As shown in FIG. 4, upon the process beginning at a start step 402, at a step 404 the web server 110 operates to accumulate information regarding privacy settings (e.g., data privacy settings or data privacy rules), user profiles, social network interaction (e.g., social network interaction history), and/or other information. These various types of information can be received at the web server 110 from any of a variety of users or mobile devices (or other devices) associated with or operated by such users, potentially over a long period of time, as those users (and/or their mobile devices or other devices) interact with the web server 110 in the web server's capacity as a SNW of which the users are members.

Among other things, it should be recognized that the information accumulated in accordance with the step 404 can come from a variety of users and not merely from the users associated with the mobile devices 102, 104, 106, 108 shown in FIG. 1. Indeed, in the present embodiment in which the web server 110 is that of a SNW, the information accumulated in accordance with the step 404 can have originated from a variety of other users (or members of the SNW) in addition to any users associated with the mobile devices 102, 104, 106, 108. Further, in at least some cases, portions of the information that is accumulated in accordance with the step 404 can come from a variety of other sources as well. The information accumulated in accordance with the step 404 is stored in the memory portion 302 of the web server 110 as described above, and among other things can form some or all of the privacy settings information 122, user profile information 124, and social network interaction history information 125 (as well as be stored as other types of information including but not limited to the NLP information 126 and image processing information 128). It should be appreciated that, although represented by a discrete step in FIG. 4, the accumulation of information represented by the step 404 is typically an ongoing process that occurs over long period of time during which the web server 110 is operating as a SNW.

At some point after some information has been accumulated at the step 404, the process can be said to advance to a step 406, at which the web server 110 receives a message or other communication from one of the mobile devices (or other devices associated with a user or otherwise). In the particular example shown in FIG. 1, for example, the web server 110 can receive the first message 130 from the first mobile device 102. As indicated in FIG. 1 (and further consistent with the step 406 of FIG. 4), in that example the first message 130 includes both a text portion and a picture file portion, which respectively are shown as an original text portion 132 and an original picture portion 134. Subsequently, at a step 407, the web server 110 further reviews or analyzes the received message contents to more particularly identify specific content. For example, the web server 110 can analyze received text content (such as for example the original text portion 132 of FIG. 1) by way of the NLP information 126 (and NLP processing) to determine whether particular names, places, times, or other details of interest can be identified in the received text content. Also for example, the web server 110 can analyze received image content (such as for example the original picture portion 134) to determine whether any of the received image content shows or concerns an image of an identifiable individual, place, or pattern.

Next, at a step 408, the web server 110 operates to review or analyze the received message contents (as understood in view of the review/analysis performed at the step 407) further in view of one or more of the data privacy rules or settings as established by the privacy settings information 110. In particular, as indicated by a further step 410, the web server 110 determines whether the data privacy rules or settings mandate that certain message contents should not be shared at all with any other users, or should not be shared with certain users in particular. For example, the web server 110 can conduct an analysis to determine if, based on the data privacy rules or settings, data in received text (such as can be included in the original text portion 132 attached to the first message 130) or in a received photograph or other image (such as can be included in the original picture portion 134 attached to the first message 130) should be modified before being forwarded to another user such as the users associated with one or more of the second, third, and fourth mobile devices 104, 106, and 108. Such data privacy rule(s) can arise, for example, if the web server 110 receives one or more communications (e.g., during the step 404) from a member of the SNW according to which that member specifies that text relating to that member or an image of that member should not be shared with a particular other user such as a user associated with the fourth mobile device 108.

If it is determined at the step 410 that the data privacy rules or settings do mandate that certain message contents should not be shared at all or should not be shared with certain users, then the process advances to a step 412, at which the web server 110 modifies the message contents as appropriate. Further in regard to an example scenario in which a member of the SNW has specified a data privacy rule according to which no image of that member should be supplied to the user associated with the fourth mobile device 108, in such a scenario, at the step 412, the web server 110 can act to blur any image received with the first message 130 (e.g., such as any image included with the original picture portion 134) to the extent that the image is determined by the web server 110 to show the member who specified the data privacy rule, when generating a message that is intended for the user associated with the fourth mobile device (albeit no blurring will occur with respect to messages intended for other users). Also, in an another example scenario in which a member of the SNW has specified a data privacy rule according to which no text concerning that member should be supplied to any other users, in such a scenario, at the step 412, the web server 110 can act to delete all text concerning that member from the first message 130 (or from the original text portion 132 thereof), or at least redact the name of the member to whom the text relates.

Once the modifying of the message in accordance with the step 412 has occurred (and results, for example, in a picture or image being blurred or deleted and/or certain text content being modified or deleted), the process then moves forward to a further step 414. Alternatively, if at the step 410 it was determined that there are no data privacy rules or settings that mandate any restrictions on the sharing or forwarding (or other transmission) of any received message contents, then the process circumstance proceeds from the step 410 to a step 416. In the present embodiment, at each of the steps 414 and 416, the web server 110 further operates to review or analyze the contents of the message received at the step 406 in view of other information (e.g., user profile or historical data) to derive one or more contexts associated with the message that was received, and/or associated with the user or mobile device from which the message that was received. The sources of data for the review or analysis performed at either of the steps 414 or 416 can vary depending upon the embodiment. To begin, the review or analysis does take into account any determinations made as a result of the review/analysis of message content that was performed at the step 407 (e.g., in terms of identifying recognizable text or image portions).

Also, the review or analysis performed at either of the steps 414 or 416 can additionally include, for example, information from one or both of the user profile information 124 (including possibly user preference information) and the social network interaction history information 125. Further, in at least some embodiments, the review or analysis performed at either of the steps 414 or 416 can includes, for example, (a) the text of the originally-received message itself, (b) historical data (e.g., social network interaction history data) or user profile information associated with any individuals and/or objects that are in any photos or images attached to the message, and (c) historical data or user profile information associated with the sender of the message as well as any intended recipient of that message. Thus, in relation to the first message 130 shown in FIG. 1, the web server 110 can conduct analysis to derive one or more contexts of that message based upon the original text portion 132 of that message, historical data or user profile information associated with any individuals and/or objects that are shown in the original picture portion 134 of that message, any historical data or user profile information pertaining particularly to the user associated with the first mobile device 102 from which the first message 130 was received, and/or any historical data or user profile information associated with any of the intended recipients of that message, for example, any of the users associated with any of the mobile devices 104, 106 and 108 of FIG. 1.

Although the review and analysis to determine context(s) is performed at each of the steps 416 and 414 in the process as represented by FIG. 4, it should additionally be observed that the step 414 differs somewhat from the step 416. In the case of the step 416, the review or analysis of the contents of the message received at the step 406 concerns all of the contents of that message. By contrast, the review or analysis of the step 414 is at least partly limited or circumscribed by the determination made at the step 410. That is, if at the step 410 it was determined that the data privacy rules or settings mandated that certain message content should not be shared in some respect, and consequently the process advanced to the step 414 rather than to the step 416, then the review or analysis performed by the web server 110 at the step 414 will not involve any review or analysis (or other consideration) of any of the received message contents that should not be shared as specified by those data privacy rules or settings.

For example, if the data privacy rules stored in the privacy settings information 122 of the web server 110 (and received at the step 404) include a rule specified by one of the members of the SNW indicating that no image of that member should be shared with the user associated with the fourth mobile device 108, then in performing the review or analysis at the step 414 in relation to the first message 130 of FIG. 1, the web server 110 will not consider any such image of that member found in the original picture portion 134 of the first message 130 to determine any contexts. Or, more particularly (or alternatively), the web server 110 will at least not consider any such image in determining any contexts to be used in generating any message to be sent to the fourth mobile device.

Upon the completion of either of the steps 414 or 416, in each case the process then advances to a step 418, at which the web server 110 then determines whether changes should be made to the message contents based on the derived contexts before the message or modified version(s) of the message is or are forwarded on to the intended recipient user or users (or mobile device(s) or other device(s) associated therewith). In the present embodiment, such changes can include adding information to the contents of the message that was originally received at the step 406 in order to arrive at one or more modified versions of that message to be sent to one or more different users (or mobile devices or other devices associated with those users). In some alternate embodiments, other changes can also be made including, further for example, deletions of certain message contents. It should be appreciated that any changes that are determined to be appropriate at the step 418 will relate to an already-modified version or versions of the originally-received message to the extent that any modifications were already made at the step 412 and the process arrived at the step 418 via the steps 412 and 414. Alternatively, to the extent the process arrived at the step 418 via the step 416, then any changes that are determined to be appropriate at the step 418 will be changes in relation to the contents of the message originally-received at the step 406.

If it is determined at the step 418 that one or more changes should be made to the message contents, then the process further advances to the step 420, at which the message contents are modified or further modified as appropriate based upon the derived contexts. As already indicated above, such modification(s) performed at the step 420 can be in addition to any modifications that already occurred at the step 412 if the step 412 was performed, or can be the first modifications that are made to the original-received message contents. Also as already indicated, in at least some embodiments, such modifications performed at the step 420 entail the adding of content to the contents of the message that was originally-received at the step 406 (although in other embodiments, other modifications to the content, including deletions of content, can occur). It should further be appreciated that the particular modifications made at each of the step 420 and the step 412 can vary depending upon the intended recipient user for that message. That is, if an originally-received message was intended for more than one recipient user, then the modifications that are made at one or both of the steps 412 and 420 to that message before that message is sent to a first additional user can be different than the modifications that are made at one or both of the steps 412 and 420 to the message before it is sent to a different one of the users.

Upon completion of any appropriate modifications at the step 420, or if no modifications should be made based upon the determination at the step 418 (other than any modifications already made in accordance with the step 412), then in either case the process advances to a step 422, at which the web server 110 sends one or more messages, as appropriately revised (as applicable) for receipt by one or more different recipients. Upon completion of the step 422, the process then ends at an end step 424, although it should be appreciated that the process can repeat indefinitely (that is, the process can return to the start step 402) and also it should be appreciated that the accumulation of information at the step 404 can continue to occur indefinitely as well as at the same time(s) as any of the other steps 406, 408, 410, 412, 414, 416, 418, 420, and 422 of the process are being performed.

Further for example in relation to FIG. 1, it can be seen how the second, third, and fourth messages 136, 138, and 140 illustrate various possible manners of operation that are all consistent with the process corresponding to the flow chart 400. Each of the second, third, and fourth messages 136, 138, and 140 is a different modified version of the first message 130 received by the web server 110 from the first mobile device 102 (on behalf of a first user associated with that mobile device) that is being sent from the web server 110 in accordance with the step 422 of FIG. 4 to a respective one of the second, third, and fourth mobile devices 104, 106, and 108, respectively (which are respectively associated with second, third, and fourth users who are the intended recipients of those modified versions of those messages).

More particularly as shown, the second message 136 includes the same original text portion 132 as was received as part of the first message 130 from the first mobile device 102 and also includes the same original picture portion 134 as was received as part of the first message 130. Further, the second message 136 additionally includes a first additional content portion 142 that has been added by the web server 110 at the step 420 as determined to be appropriate at the step 418 in accordance with one or more context determinations made at the step 414 by the web server 110. In this example, the contexts that are considered by the web server 100 in determining the first additional content portion 142 can for example be based at least in part upon one or both of (i) preferences of each of a first user associated with the first mobile device 102 as well as a second user associated with the second mobile device 104, as specified in their user profiles stored as the user profile information 124, as well as (ii) the social network interaction history information 125 pertaining to those users.

By comparison, the third message 138 communicated from the web server 110 to the third mobile device 106, although similar to the message 136 (in that it also includes the original text portion 132 and the original picture portion 134), is nevertheless a differently-modified version of the first message 130 in that the third message 138 includes a second additional content portion 144 rather than the first additional content portion 142. Again, in this example, the second additional content portion 144 can be added by the web server 110 at the step 420 as determined to be appropriate at the step 418 in accordance with one or more context determinations made at the step 414. And again, in this example, the contexts that are considered by the web server 100 in determining the second additional content portion 144 can for example be based at least in part upon one or both of (i) preferences of each of a first user associated with the first mobile device 102 as well as a third user associated with the third mobile device 106, as specified in their user profiles stored as the user profile information 124, as well as (ii) the social network interaction history information 125 pertaining to those users.

As for the fourth message 140 communicated from the web server 110 to the fourth mobile device 108 associated with yet another user recipient, that message is a further modified version of the first message 130 that differs from the first and second messages 136 and 138 in two different manners. First, rather than including either of the first or second additional content portions 142 or 144, the fourth message 140 instead includes a third additional content portion 148. Again, in this example, the third additional content portion 148 can be added by the web server 110 at the step 420 as determined to be appropriate at the step 418 in accordance with one or more context determinations made at the step 414. And again, in this example, the contexts that are considered by the web server 100 in determining the third additional content portion 148 can for example be based at least in part upon one or both of (i) preferences of each of a first user associated with the first mobile device 102 as well as a fourth user associated with the fourth mobile device 108, as specified in their user profiles stored as the user profile information 124, as well as (ii) the social network interaction history information 125 pertaining to those users.

Additionally, although the fourth message 140 (as with the second and third messages 136 and 138) includes the original text portion 132, the fourth message 140 no longer includes the original picture portion 134 but rather includes a blurred picture portion 146. In this regard, it should particularly be understood that the blurred picture portion 146 is provided in accordance with operation of the step 412 of the flow chart 400, as arrived at via a determination made at the step 410 and based upon the review or analysis performed at the step 408 as well as the review or analysis performed at the step 407. More particularly, in this example, FIG. 1 is indicative of operation in which the web server 110 modifies the original picture portion 134 to become the blurred picture portion 146 at the step 412 based upon (a) a determination at the step 407 that a member of the SNW is shown in an image included in the original picture portion 134, (b) a further determination at the step 408 that the member of the SNW to which the image pertains has specified, as a data privacy rule contained within the privacy settings information 122, that the member's picture should not be sent to the user associated with the fourth mobile device 108, and (c) an additional determination at the step 410 that this data privacy rule mandates that the image of that member should be blurred before a message corresponding to (or based upon) the originally-received first message 130 is sent for receipt by the fourth mobile device 108.

Thus, in the above example shown in FIG. 1 in which all of the second, third, and fourth messages 136, 138, and 140 are generated, three different modified versions of the first message 130 are sent out by the web server 110 in accordance with the step 422 of the flow chart 400, for receipt respectively by the three different mobile devices 104, 106, and 108. It should be appreciated from the above discussion that, at least for the present example, the process performed to generate all three of the messages 136, 138, and 140 is considered to be performed in relation to all three of the messages as a group. That is, the process of FIG. 4 is performed one time because all three of the message 136, 138, and 140 are being sent in response to the receipt of a single message, the first message 130. Thus, in the present example, since the data privacy rules do mandate restrictions in relation to at least the fourth user associated with the fourth mobile device 108, the process performed to generate all three of the messages 136, 138, and 140 particularly includes the performing of the steps 412 and 414 (rather than the step 416).

Nevertheless, it should be appreciated from the above description that the particular contents of each different one of the messages 136, 138, and 140 are determined in a manner that is suited to the respective target recipient of each individual basis. That is, even though in the above discussion the process of FIG. 4 is performed one time to generate all three of the messages 136, 138, and 140, it should be appreciated that each of these messages is determined in a "per recipient" manner that takes into account information regarding the respective recipient of the respective message. That is, the review and/or analyses performed at each of the steps 407, 408, 414, and 416, any determinations made at the steps 410 and 418, and any modifications made to message contents at any of the steps 412 and 420, to arrive at each of the different ones of the messages 136, 138, and 140 sent out at the step 422, take into account information concerning the intended recipient of the respective message. Further, it should be recognized that the information that can be taken into account for this purpose can include any of a variety of types of information including, for example, data privacy rules or settings, user profile information, user preferences information, and/or social network interaction history information regarding the intended recipient, including any information regarding any relationship or historical interactions (or related preference or profile information pertaining to any relationship or interactions) between the intended recipient and the sender of the original message (e.g., the first user who sent the first message 130) received by the web server 110, as well as any other available information that particularly relates to the intended recipient.

Given this to be the case, it should be appreciated that the flow chart 400 of FIG. 4 is merely intended to provide an example description of one example embodiment of a process performed by the system 100 (and particularly the web server 110), and that the present disclosure is also fully intended to encompass processes in which other, more specific identifiable steps are performed in order to generate, on an independent basis (e.g., on a basis that takes into account the intended recipient of the message), each individual message to be sent out by the web server 110 to a recipient (e.g., at the step 422). Accordingly, it should further be appreciated that, in at least some embodiments encompassed herein, the generation of the messages 136, 138, and 140 can involve repeated or separate performances of at least some steps of the flow chart 400 of FIG. 4 or steps that are substantially similar to at least some of the steps of the flow chart 400. For example, the generation of the messages 136, 138, and 140 can also be viewed as entailing three different process performances, one for each message, where two of the process performances relating to the messages 136 and 138 involve the performing of the step 416 (since the data privacy rules in this example, as discussed above, only pertain to the user associated with the fourth mobile device 108 but do not pertain to the users associated with the second or third mobile devices 104 and 106) and the other of the process performances relating to the message 140 involves the performing of the steps 412 and 414 (since the data privacy rules in this example, as discussed above, pertain particularly the user associated with the fourth mobile device 108).

The above examples corresponding to FIG. 1 can be made even more specific, to further illustrate operation of the system 100 and particularly the web server 110 thereof. Additionally for example, it can be the case that the first message 130 and particularly the original text portion 132 thereof indicate that the first user (the sender of that first message) intends to go on a trip to a location such as New York City in a particular time period such as the coming weekend. Given such an initial message, and given that the web server 110 is able to discern details about these plans by way of the analysis performed at the step 407, then at either the step 416 or the step 414 the web server 110 can further determine a context by consulting other information stored in its memory portion 302 such as the user profile information 124 and social network interaction history information 125 to determine that (i) second, third, and fourth users (and members of the SNW) respectively associated with the second, third, and fourth mobile devices 104, 106, and 108, respectively, all are friends of the first user associated with the first mobile device 102, (ii) the second user enjoys rock and roll music, (iii) the third user enjoys symphony music or Broadway shows, and (iv) the fourth user enjoys sporting events.

Based upon this context information, the web server 110 can further determine at the step 418 that various different modifications to the original first message 130 are appropriate and that different modified versions of that message should be respectively sent to the different second, third, and fourth users associated with the second, third, and fourth mobile devices 104, 106, and 108, respectively. Then, at the step 420, the web server 110 can particularly modify the first message 130 to include additional content portions that are suitable for the three different users of the mobile devices 104, 106, and 108. For example, the first additional content portion 142 added to the second message 136 can include additional information about various local bars and upcoming rock and roll concerts, while the second additional content portion 144 added to the third message 138 can include additional information about the various theater options or symphony options that might be of interest to the third user associated with the third mobile device 106, and additionally while the third additional content portion 148 added to the fourth message 140 can include information about a New York Yankees game.

Additionally, in relation to the fourth message 140, it can also be determined by the web server 110 at the step 407 that an image included in the original picture portion 134 includes a picture of an identifiable individual who happens to be a member of the SNW (e.g., the spouse of the first user who sent the first message 130 from the first mobile device 102). Further, it can be determined at the step 408 that the member of the SNW has set a data privacy rule that that member's picture should not be communicated to the particular user associated with the fourth mobile device 108. Given these considerations, at the step 410 the web server 110 proceeds to determine that there is a data privacy rule mandating that the image in question not be sent to a particular user, namely, the user associated with the fourth mobile device 108. Subsequently, the web server 110 operates to modify the message contents and particularly the imagery associated with the original picture portion 134 so as to arrive at the fourth message 140, in which the original picture portion 134 (e.g., showing an image spouse of the first user of the first mobile device 102) has been changed to the blurred image portion 146 (no longer clearly showing the image of the spouse of the first user).

Again, the aforementioned operations are merely examples that are intended to be encompassed by the present disclosure and the present disclosure is intended to encompass numerous other manners of operation in addition to those specifically described above. Indeed, the present disclosure is intended to encompass numerous different numbers and types of messages that are generated, revised, and/or otherwise processed in a variety of manners to suit any of a variety of types of information, preferences, situations, circumstances, and context. Such operation is intended to encompass, but is not limited to, the generation of messages that involves revisions entailing deletion or obscuring of information such as blurring of images based upon privacy settings information or otherwise, and/or entailing additions of various information that is appropriate in view of user profile information, user preferences, privacy settings, social network interaction history, and/or other data or information, including information included in or accompanying received message information or content (e.g., received image or photographic information such as the original picture portion 134 or metadata associated with such received image or photographic information), and/or that is appropriate in view of context(s) determined or derived based upon such information or data. Also as discussed above, such operation is intended to encompass, in at least some embodiments, operation according to which such generation of messages and/or related determinations, including context determinations, take into account some types of information while refraining from taking into account other information that is subject to data privacy settings or rules or other restrictions. Numerous other examples of operation of the system 100 and particularly the web server 110 in accordance with the process 400 or variations of that process can be envisioned and are encompassed herein.

Further for example, in at least some embodiments, the present disclosure relates to a method of selectively communicating information by way of a network. The method includes receiving at a server associated with the network first information portions regarding one or more preferences, instructions, user profile details, or operational history details provided via the network from a plurality of mobile devices respectively associated with a plurality of users, respectively. The method also includes receiving an initial version of a first message including additional information as provided via the network from an additional mobile device associated with an additional user. The method additionally includes determining based upon one or more of the first information portions that at least some of the additional information should be modified or deleted from the first message, where the determining includes further determining one or more contexts based at least in part upon a review of the additional information excepting a first portion of the additional information is subject to at least one data privacy setting. Also, the method includes generating a first modified version of the first message by modifying or deleting the at least some of the additional information based upon the determining, and sending onto the network, for receipt by a first further mobile device associated with a first further user, the first modified version of the first message. Accordingly, in at least some embodiments, the first modified version of the message can include additional relevant content suited for each given recipient, based on (for example) preference, profile, or history information.

Additionally, in at least some embodiments, the present disclosure relates to a method of selectively communicating information by way of a network. The method includes storing at a server associated with the network first information portions regarding one or more preferences, instructions, user profile details, or operational history details associated with a plurality of users, and receiving an initial version of a first message off of the network from a first electronic device associated with a first additional user, wherein the first message includes additional information. The method also includes determining based upon one or more of the first information portions that at least one change should be made to the additional information. The method further includes generating a first modified version of the first message by making the at least one change to the additional information based upon the determining, and sending onto the network, for receipt by a second electronic device associated with a second additional user, the first modified version of the first message. The first modified version of the first message differs from the first message both because the first modified version of the first message includes first supplemental content not included in the first message, and because an image included in the first message is provided in an obscured manner in the first modified version of the first message.

Further, in at least some embodiments, the present disclosure relates to a system for selectively communicating information by way of a network. The system includes a web server computer. The web server computer includes at least one communication port by which the web server computer is capable of communicating with a plurality of electronic devices via the network. The web server computer also includes at least one memory device in which are stored a plurality of first information portions regarding one or more preferences, instructions, user profile details, or operational history details pertaining to a plurality of users associated with the plurality of electronic devices. The web server computer further includes at least one processing device coupled at least indirectly to each of the at least one communication port and the at least one memory device. The at least one processing device is configured to: (a) analyze a second information portion associated with an initial message received via the at least one communication port from a first of the electronic devices, but refrain from analyzing a further information portion associated with the initial message that is subject to at least one data privacy setting;

(b) determine a modification that should be made to the second information portion based upon the analyzed second information portion and at least one of the first information portions; (c) generate a modified version of the initial message in accordance with the determined modification; and (d) cause a sending of the modified version of the initial message onto the network for receipt by a second of the electronic devices.

It should be appreciated that one or more embodiment encompassed by the present disclosure are advantageous in one or more respects. For example, in at least some embodiments, messages forwarded by an intermediary web server 110 to one or more recipients advantageously take into account the privacy concerns of one or more other persons, thereby avoiding disclosure or sharing of information in a manner that may be undesired or inappropriate from the vantage point of those one or more other persons. Further for example, in at least some embodiments, messages forwarded an intermediary web server 110 to one or more recipients advantageously takes into account any of a variety of types of information that help ascertain context and modifies the messages before the messages are forwarded so that the forwarded messages are more useful or relevant for the intended recipient. In some cases, forwarded messages developed in this manner can help strengthen relationships or foster further communications or interactions among the communicating parties.

Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A method of selectively communicating information by way of a network, the method comprising:
   receiving at a server associated with the network first information portions regarding one or more preferences, instructions, user profile details, or operational history details provided via the network from a plurality of computing devices respectively associated with a plurality of users, respectively;
   receiving an initial version of a message including additional information as provided via the network from an additional computing device associated with an additional user, the message being a communication from the additional user to a plurality of recipient users of the plurality of users, each of the plurality of recipient users being associated with a respective recipient user computing device;
   determining, for each particular recipient user of the plurality of recipient users and based upon one or more of the first information portions, whether at least some of the additional information should be modified or deleted from the message before being sent to the particular recipient user; and
   sending onto the network, for receipt by each recipient user computing device associated with each particular recipient user, either the initial version of the message or a modified version of the message based on the determining,
   wherein the modified version of the message is generated and sent onto the network when the determining is that at least some of the additional information should be modified or deleted from the message, and
wherein the initial version of the message is sent onto the network when the determining is that at least some of the additional information should not be modified or deleted from the first message.

2. The method of claim 1, wherein the modified version of the message generated and sent onto the network for a first recipient user computing device associated with a first particular recipient user differs from the modified version of the message generated and sent onto the network for a second recipient user computing device associated with a second particular recipient user.

3. The method of claim 1, further comprising generating the modified version of the message, wherein one or both of the determining or the generating include performing one or both of one or more natural language processing operations by way of a natural language processor (NLP), or one or more image processing operations by way of an image processor.

4. The method of claim 1, wherein the network is a social network, wherein the server is a web server computer, and wherein the first information portions include the at least one data privacy setting, which relate to sharing of user information between each respective pair of the plurality of users associated with the social network.

5. The method of claim 1, wherein the received first information portions include a first preference of the one or more preferences, wherein the first preference is that of a first user of the plurality of users, and wherein the first preference is that images showing the first user should not be communicated.

6. The method of claim 5, wherein the additional information includes a first image showing the first user, and wherein generating of the modified version of the message includes either deleting the first image from the message or modifying the first image so that it is blurred or otherwise obscured.

7. The method of claim 1, wherein the modified version of the message is generated by adding supplemental information to the additional information.

8. The system of claim 1, wherein the network is a social network, and wherein the first information portions include the at least one data privacy setting, which relate to sharing of user information between each respective pair of the plurality of users associated with the social network.

9. A system for selectively communicating information by way of a network, the system comprising:
a web server computer including:
at least one communication port by which the web server computer is capable of communicating with a plurality of electronic devices via the network;
at least one memory device in which is stored a plurality of first information portions regarding one or more preferences, instructions, user profile details, or operational history details pertaining to a plurality of users associated with the plurality of electronic devices; and
at least one processing device coupled at least indirectly to each of the at least one communication port and the at least one memory device, wherein the at least one processing device is configured to:
receive an initial version of a message including additional information as provided via the network from an additional computing device associated with an additional user, the message being a communication from the additional user to a plurality of recipient users of the plurality of users, each of the plurality of recipient users being associated with a respective recipient user computing device;
determining, for each particular recipient user of the plurality of recipient users and based upon one or more of the first information portions, whether at least some of the additional information should be modified or deleted from the message before being sent to the particular recipient user; and
sending onto the network, for receipt by each recipient user computing device associated with each particular recipient user, either the initial version of the message or a modified version of the message based on the determining,
wherein the modified version of the message is generated and sent onto the network when the determining is that at least some of the additional information should be modified or deleted from the message, and
wherein the initial version of the message is sent onto the network when the determining is that at least some of the additional information should not be modified or deleted from the first message.

10. The system of claim 9, wherein the modified version of the message generated and sent onto the network for a first recipient user computing device associated with a first particular recipient user differs from the modified version of the message generated and sent onto the network for a second recipient user computing device associated with a second particular recipient user.

11. The system of claim 9, wherein the at least one processing device is further configured to generate the modified version of the message, wherein one or both of the determining or the generating include performing one or both of one or more natural language processing operations by way of a natural language processor (NLP), or one or more image processing operations by way of an image processor.

12. The system of claim 9, wherein the received first information portions include a first preference of the one or more preferences, wherein the first preference is that of a first user of the plurality of users, and wherein the first preference is that images showing the first user should not be communicated.

13. The system of claim 12, wherein the additional information includes a first image showing the first user, and wherein generating of the modified version of the message includes either deleting the first image from the message or modifying the first image so that it is blurred or otherwise obscured.

14. The system of claim 9, wherein the modified version of the message is generated by adding supplemental information to the additional information.

15. A non-transitory computer-readable storage medium having a plurality of instructions stored thereon, which, when executed by one or more processors, cause the one or more processors to perform operations for selectively communicating information by way of a network, the operations comprising:
receiving at a server associated with the network first information portions regarding one or more preferences, instructions, user profile details, or operational history details provided via the network from a plurality of computing devices respectively associated with a plurality of users, respectively;
receiving an initial version of a message including additional information as provided via the network from an additional computing device associated with an additional user, the message being a communication from the additional user to a plurality of recipient users of the plurality of users, each of the plurality of recipient users being associated with a respective recipient user computing device;

determining, for each particular recipient user of the plurality of recipient users and based upon one or more of the first information portions, whether at least some of the additional information should be modified or deleted from the message before being sent to the particular recipient user; and sending onto the network, for receipt by each recipient user computing device associated with each particular recipient user, either the initial version of the message or a modified version of the message based on the determining, wherein the modified version of the message is generated and sent onto the network when the determining is that at least some of the additional information should be modified or deleted from the message, and wherein the initial version of the message is sent onto the network when the determining is that at least some of the additional information should not be modified or deleted from the first message.

16. The non-transitory computer-readable storage medium of claim 15, wherein the modified version of the message generated and sent onto the network for a first recipient user computing device associated with a first particular recipient user differs from the modified version of the message generated and sent onto the network for a second recipient user computing device associated with a second particular recipient user.

17. The non-transitory computer-readable storage medium of claim 15, wherein the operations further comprise generating the modified version of the message, wherein one or both of the determining or the generating include performing one or both of one or more natural language processing operations by way of a natural language processor (NLP), or one or more image processing operations by way of an image processor.

18. The non-transitory computer-readable storage medium of claim 15, wherein the network is a social network, wherein the server is a web server computer, and wherein the first information portions include the at least one data privacy setting, which relate to sharing of user information between each respective pair of the plurality of users associated with the social network.

19. The non-transitory computer-readable storage medium of claim 15, wherein the received first information portions include a first preference of the one or more preferences, wherein the first preference is that of a first user of the plurality of users, and wherein the first preference is that images showing the first user should not be communicated.

20. The non-transitory computer-readable storage medium of claim 19, wherein the additional information includes a first image showing the first user, and wherein generating of the modified version of the message includes either deleting the first image from the message or modifying the first image so that it is blurred or otherwise obscured.

* * * * *